United States Patent [19]

Culbertson et al.

[11] Patent Number: 5,350,601

[45] Date of Patent: Sep. 27, 1994

[54] PROCESS FOR MAKING AND USING POLYMERIC FILM COATED WITH PRIMER COATING FOR SILICONE RELEASE APPLICATIONS

[75] Inventors: Edwin C. Culbertson, Greer; Grover L. Farrar, Greenville, both of S.C.

[73] Assignee: Hoechst Celanese Corporation, Somerville, N.J.

[21] Appl. No.: 788,658

[22] Filed: Nov. 6, 1991

[51] Int. Cl.$^5$ ............................................. B05D 1/36
[52] U.S. Cl. ........................... 427/412.1; 427/412.3; 427/412.5; 427/387; 427/152
[58] Field of Search ...................... 427/412.1, 209, 152, 427/387, 412.3, 412.5

[56] References Cited

U.S. PATENT DOCUMENTS

| | | | |
|---|---|---|---|
| 3,779,993 | 12/1973 | Kibler et al. | 524/602 |
| 3,798,192 | 3/1974 | Kenton | 524/730 |
| 4,070,224 | 1/1978 | Zemlin | 427/302 |
| 4,177,301 | 12/1979 | Smith, Jr. | 427/412.5 |
| 4,313,988 | 2/1982 | Koshar | 427/387 |
| 4,343,855 | 8/1982 | Condor | 428/332 |
| 4,463,114 | 7/1984 | Balchunis et al. | 428/447 |
| 4,493,872 | 1/1985 | Funderburk et al. | 427/250 |
| 4,605,591 | 8/1986 | Nose et al. | 427/412.5 |
| 4,786,558 | 11/1988 | Sumiya et al. | 428/412 |
| 5,045,360 | 9/1991 | Kosal et al. | 427/387 |
| 5,047,278 | 9/1991 | Ono et al. | 428/694 |
| 5,077,353 | 12/1991 | Culbertson | 525/446 |
| 5,139,815 | 8/1992 | Patterson | 427/412.1 |
| 5,212,260 | 5/1993 | Culbertson | 525/446 |
| 5,238,708 | 8/1993 | Blizzard | 427/412.1 |
| 5,281,656 | 1/1994 | Thayer et al. | 427/387 |
| 5,298,325 | 3/1994 | Culbertson | 428/336 |

FOREIGN PATENT DOCUMENTS 651101 10/1962 Canada .
645838 6/1987 Japan .

*Primary Examiner*—Shrive Beck
*Assistant Examiner*—Diana Dudash
*Attorney, Agent, or Firm*—Gregory N. Clements

[57] ABSTRACT

The present invention describes a process for priming a polymeric film with a primer coating composition and overcoating with a silicone release coating. Silicone release films are well known and serve as temporary supports for an adhesive or tacky surface such as for labels, pressure sensitive tape, etc. The primer coating composition, before dilution with water, comprises from about 25 to 75% by weight of a glycidoxy silane and from about 75 to 25% by weight of a copolyester. The copolyester comprises from about 40 to 98 mol percent isophthalic acid; from about 0 to about 50 mol percent of at least one aliphatic dicarboxylic acid; from about 2 to about 20 mol percent of at least one sulfonate group attached to a dicarboxylic nucleus; and about 100 mol percent of glycol having from about 2 to 11 carbon atoms. Typical glycidoxy silanes that can be employed in the primer coating composition include glycidoxypropyltrimethoxysilane.

27 Claims, No Drawings

PROCESS FOR MAKING AND USING POLYMERIC FILM COATED WITH PRIMER COATING FOR SILICONE RELEASE APPLICATIONS

BACKGROUND OF THE INVENTION

1. Field of the Invention

The present invention relates to a process for priming a polymeric film with an effective amount of a primer coating composition on at least one side thereof to improve its bonding to silicone release compositions, and a process for bonding a silicone release coating to polymeric film. The primer coating consists of a copolyester composition uniformly blended with a glycidoxy silane. It has been found that this primer coating composition is excellent for the field of silicone release films and yields superior adhesion performance over known silicone release films.

2. Prior Art

Release films are well known and are generally employed to serve as a temporary support for an adhesive or tacky surface such as labels, pressure sensitive tape, decorative laminates, transfer tape, etc. Silicone compositions have long been used as the release coating for rendering the support surface (usually a paper support) relatively non-adherent to adhesive materials. Using various polymeric films as temporary supports is well known but most polymeric materials are virtually inert, and thus it is difficult to obtain adhesion between the silicone release coating and the polymeric film. Commercially available silicone release films initially have acceptable adhesion performance (adhesion between the support and the silicone release coating). However, with time the adhesion of the silicone release coating lessens which causes the release coating to rub off. This may cause silicone release material to be removed from the support when the label is peeled away, and thus the label may fail to properly stick. Also, the poor adhesion of the silicone release coating to the support may cause the silicone release coating to detach from the support, especially upon further processing of the coated film. This may cause the label to stick to the support and not properly detach for placement.

Prior commercial practice for manufacturing silicone release film does not involve employing primer coatings on the support. Typically, manufacturers have relied on silicone producers to formulate release compositions capable of adhering to the manufacturer's support. Consequently, there are many different types of silicone release compositions for many different supports.

Primer coating compositions for polymeric film supports are well known for product applications other than silicone release films. Primer coatings based upon polyolefins, polyesters, vinyls, alcohols, acids and acrylates are well known for film applications in the packaging industry, magnetic tape industry, and reprographic film industry. Exemplary of a known primer coating for the packaging industry is the following patent.

U.S. Pat. No. 4,493,872 to Funderburk et al (assigned to the present assignee) discloses a copolyester primer coating which may be applied to a polymeric film such as polyamides, polyolefin, polysulfones, polyacetal, polycarbonate and polyester (such as polyethylene terephthalate). This copolyester coating composition, when applied to a polymeric support, provides excellent adhesion between the polymeric support and a subsequently applied metallic coating.

The Funderburk et al copolyester primer coating composition consists of:
a) about 65 to 95 mol percent of isophthalic acid;
b) about 0 to 30 mol percent of at least one aliphatic dicarboxylic acid;
c) from about 5 to about 15 mol percent of at least one sulfomonomer; and
d) an alkylene glycol having from about 2 to 11 carbon atoms.

One approach for applying a primer coating to a polymeric support for silicone release applications is Japanese patent 64-5838 laid open on Jan. 10, 1989. This patent discloses a release film comprising a polyester film, a primer layer applied to the polyester film which consists of a crosslinkable silane coupling agent, and the silicone release layer applied to the silane coupling agent. The silane coupling agent may consist of a vinyl, epoxy (glycidoxy), amino, or mercapto silane. Once the silane primer coating has been applied and crosslinked with the polyester support film, it is then ready for uniform application of the silicone release coating.

Neither of the above references provide sufficient adhesion between the silicone release coating and the primed film such that the silicone release coating will not rub off. It is an aim of the present invention to provide a process of priming a polymeric support film with an effective amount of a primer coating to improve its bonding to a silicone release coating.

It is known that certain silicone release coatings will initially have excellent bonding to the polymeric support film, but this characteristic deteriorates rapidly (usually within one to seven days) such that the release film is unusable for long term applications.

An object of the present invention is to provide a process for priming a release film with a primer coating which maintains its original bonding characteristics to the silicone release coating for a sufficient period of time.

There are many different formulations of known silicone release coatings, such as crosslinked formulations, ultra violet curable or heat curable formulations, solvent, and solventless formulations, and combinations of these, such as solventless—u.v. curable formulations.

It is an aspect of the present invention to provide a process for priming a polymeric support with a primer coating which is compatible with and bonds well to a broad range of silicone release coatings as well as different polymeric supports.

SUMMARY OF THE INVENTION

In keeping with the foregoing aims, objects and aspects of the present invention, the process of the present invention is congruent with coating a large class of polymeric substrates with a primer comprising isophthalic acid, at least one sulfomonomer containing a sulfonate group attached to a dicarboxylic nucleus, ethylene glycol, and a glycidoxy silane. This primer coating composition may optionally include diols, other dicarboxylic acids, and other silanes.

In the broadest sense of the present invention it is contemplated that the process for priming a polymeric film with an effective amount of a primer coating thereon to bond to a silicone release coating comprises: priming a polymeric film with an effective amount of said primer coating comprising, before dilution, from 25 to 75% by weight glycidoxy silane and from 75 to 25% by weight copolyester, wherein said copolyester comprises:

from about 40 to 98 mol percent isophthalic acid;
from about 0 to about 50 mol percent of at least one aliphatic dicarboxylic acid;
from about 2 to about 20 mol percent of at least one sulfomonomer containing a sulfonate group attached to a dicarboxylic nucleus; and
about 100 mol percent of glycol having from about 2 to 11 carbon atoms; and
drying said primer coating.

DESCRIPTION OF THE PREFERRED EMBODIMENTS

The process of the present invention is applicable to any polymeric film capable of acting as a substrate for the primer coating and the silicone release coating. In particular, the present invention is applicable to polymeric films such as those made from polyamides exemplified by nylon; polyolefins such as polypropylene and polyethylene; polyester such as polyethylene terephthalate; polyacetal; polycarbonate; and the like. The invention is particularly applicable to polyester, but is not limited to polyethylene terephthalate or polybutylene terephthalate. The present invention can also utilize copolyesters such as polyethylene terephthalate isophthalate. Generally any polyester film based on a polymer resulting from the polycondensation of a glycol or diol with a dicarboxylic acid (or the ester equivalents) such as terephthalic acid, isophthalic acid, sebacic acid, malonic, adipic, azelaic, glutaric, suberic, succinic, and the like, or mixtures of these, can be employed in the present invention. Suitable glycols could be ethylene glycol, diethylene glycol, polyethylene glycol, and polyols such as butanediol, and the like.

Any of the above polymeric films can contain conventional additives such as antioxidants, delusterants, pigments, fillers such as silica, calcium carbonate, kaolin, titanium dioxide, antistatic agents, etc., all of which are well known in the art.

Additionally, the polymeric film may comprise a polymeric laminate such as a polymer-polymer laminate like polyester-polyolefin, for example, or a polymer-metallic laminate such as polyester-aluminum, or a polymeric paper laminate, or the like.

The films may be produced by any well known techniques in the art. For example, polyester is typically melted and extruded as an amorphous sheet onto a polished revolving casting drum to form a cast sheet of the polymer. The sheet is quickly cooled and then stretch oriented in one or more directions to impart strength and toughness to the film. Stretching typically occurs in a range of two to four times the original cast sheet dimension in one or both directions. Generally, stretching occurs in a temperature range from about the second order transition temperature of the polymer to below the temperature at which the polymer softens and melts. Where necessary, the film is heat treated after stretching to "lock-in" the properties by further crystallizing the film. The crystallization imparts stability and good tensile properties to the film. Such heat treatment for polyester film is generally in a range between 190° C. to 240° C.

With respect to the primer coating composition of the present invention, it consists of two parts, namely a glycidoxy silane and a copolyester. The glycidoxy silane may be glycidoxypropyltrimethoxysilane or glycidoxypropylmethyldiethoxysilane, or generally any glycidoxy silane represented by the formula X—Y—Si—$R_1R_2R_3$, where X is a glycidoxy group, Y is an alkylene group, such as methylene, ethylene, propylene, etc., $R_1$ and $R_2$ are hydrolyzable groups, such as methoxy, ethoxy, acetoxy, and the like, and $R_3$ may be a hydrolyzable group or a non-hydrolyzable group. If $R_3$ is a non-hydrolyzable group, it may be an alkyl such as methyl, ethyl, and the like, or aryl such as phenyl, naphthyl, and the like. These silanes may possess water solubility or water dispersibility.

With respect to the copolyester portion of the primer coating composition, it may generally be prepared as described in U.S. Pat. No. 4,493,872 to Funderburk et al, except that the percentage of the sulfomonomer level is slightly broader for the present invention than that set forth in the above patent. Moreover, the sulfomonomer of the present invention is not limited to an alkali metal sulfonate group as disclosed in the Funderburk et al patent. The sulfomonomer group of the present invention may comprise any sulfomonomer in which a sulfonate group is attached to a dicarboxylic nucleus. It is noted in the above patent that the lower limit for the sulfomonomer group is stated to be 5 mol percent, and that this amount is required to impart water dispersibility to the primer. With the present invention, a slightly lower amount of the sulfomonomer group may be employed. Furthermore, the present invention enjoys a slightly broader range for isophthalic acid and for aliphatic dicarboxylic acid.

Generally, the copolyester of the present invention can comprise, before dilution:

a) from about 40 to 98 mol percent isophthalic acid;
b) about 0 to 50 mol percent of at least one aliphatic dicarboxylic acid;
c) from about 2 to about 20 mol percent of at least one sulfomonomer containing a sulfonate group attached to a dicarboxylic nucleus; and
d) stoichiometric quantities of about 100 mol percent of at least one copolymerizable glycol having from about 2 to 11 carbon atoms.

The aliphatic dicarboxylic acids, sulfomonomers, and glycols which may be employed in the present invention are those described in the Funderburk patent. Sulfomonomers suitable for the present invention are generally represented by the formula:

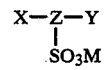

wherein M is a monovalent cation and may be selected from the group of alkali metals, ammonium, substituted ammonium and quaternary ammonium; Z is a trivalent radical; and X and Y are carboxyl groups or polyester forming equivalents. Sulfomonomers wherein Z is aromatic are disclosed in U.S. Pat. Nos. 3,563,942 and 3,779,993, incorporated herein by reference. Species of such monomers include sodium sulfoterephthalic acid; ammonium sulfoterephthalic acid; sodium 5-sulfoisophthalic acid; ammonium 5-sulfoisophthalic acid; sodium sulfophthalic acid; ammonium sulfophthalic acid; 5-(p-sodiosulfo-phenoxy) isophthalic acid; 5-(sulfopropoxy)-isophthalic acid, sodium salt [5-(sodiosulfopropoxy)-isophthalic acid]; and like materials as well as their polyester forming equivalents, such as the dimethyl esters.

Sulfomonomers wherein Z is aliphatic are disclosed in U.S. Pat. No. 3,734,874, incorporated herein by reference. Other examples of aliphatic sulfomonomers are sulfonated aliphatic dicarboxylic acids (or their ester equivalents) wherein the sulfonated group depends from a trivalent alkyl group. Examples are sulfopropyl malonic acid

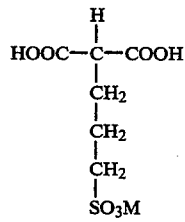

where Z=CH—CH$_2$—CH$_2$—CH$_2$ and sulfonated succinic acid,

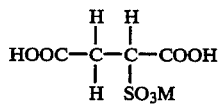

where Z=CH$_2$—CH, etc.

Examples of suitable glycols include ethylene glycol; diethylene glycol; butanediol; 1,5-pentanediol; 1,6-hexanediol; neopentyl glycol; 1,10-decanediol; cyclohexane dimethanol; and similar materials. Ethylene glycol is the much preferred glycol.

Examples of suitable aliphatic dicarboxylic acids include malonic, adipic, azelaic, glutaric, sebacic, suberic, succinic, brassylic acids and mixtures thereof, or their polyester forming equivalents. Sebacic acid is the preferred diacid.

To the extent applicable, U.S. Pat. No. 4,493,872 to Funderburk et al is incorporated herein by reference.

The proportion of the glycidoxy silane to the copolyester may be in a range from about 25 to 75% by weight glycidoxy silane and about 75 to 25% by weight of the copolyester. Although the scope of the present invention is intended to cover ranges even broader than these, it is noted that these ranges give better results. For example, more silane may be added, however, adhesion will not significantly improve. On the other hand, less silane may be added and the formulation will work with a few silicone release formulations, however, the primer composition will not universally perform as well as the present range. Preferentially, the components are mixed on a basis of one weight part of the glycidoxy silane to two weight parts of the copolyester. The components are uniformly blended with one another to produce the primer coating of the present invention.

The primer coating of the present invention is typically applied to the base film as an aqueous dispersion and at a solids concentration within the range of about 0.5 to 12% by weight, preferably from about 2 to 6% by weight, and more preferably 4% by weight with the preferred component composition of one weight part glycidoxy silane to two weight parts of the copolyester. The preferred solids level, as it is applied to the polymeric substrate, is such to yield a final dry coating thickness within the range of about 0.00305 g/m$^2$ to 3.05 g/m$^2$. The preferred thickness range of the dried primer coating is from about $1 \times 10^{-7}$ to $1 \times 10^{-4}$ inch, with $1 \times 10^{-6}$ inch being the target thickness.

The primer coating may be applied to the polymeric substrate by any known method. For example, roll coating, reverse roll coating, gravure coating, reverse gravure roll coating, brush coating, spray coating, air knife coating, dipping, or meniscus coating may be employed.

The coating may be applied to one or both sides of the film, depending on its final application. For example, in those situations where it is desirable to have a silicone release coating applied to both sides of a polymeric film for differential release, the film may be coated on each side with a primer coating and then overcoated with the silicone release coating described hereinafter.

Primer coated films of the present invention exhibit excellent heat stability, and accordingly, any scrap coated film made during the production can be mixed with fresh polymer (for example polyester polymer), remelted, and re-extruded to produce an oriented film support. Such films could contain up to about 70% by weight of coated scrap reclaim, particularly in applications where color and appearance of the substrate are not critical. In those applications where color and appearance are important, the amount of reclaim employed can be up to an amount where perceptible degradation of the color properties (due to the presence of the coating impurities) is not easily or readily detected.

In-line coating of the polymeric support (where the primer coating is applied during the manufacturing process of the film, before it is heat-set) is the preferred method of applying the primer coating to the polymeric film. Typically, the polymeric film may be coated after corona treatment and prior to the stretch orientation of the film as described in British Patent No. 1,411,564, or coated interdraw in those production methods in which a biaxially oriented film is employed, as taught by U.S. Pat. No. 4,571,363, or coated post draw as taught by U.S. Pat. No. 3,322,553.

Moreover, the scope of the present invention would also cover the application method wherein a first coating of the copolyester coating was applied in-line to the polymeric substrate, then such a coating was dried, and then recoated with the glycidoxy silane, with the coatings being done either before, between or after the drawing process. For example, the scope of the present invention would cover the application of the copolyester coating composition being applied before any draw orientation or stretch orientation steps during the production of the polymeric film, and stretch orienting the film in one direction, and then applying the glycidoxy silane interdraw, and then stretching the film in the final direction.

In addition to in-line coating, it has also been determined that the primer coating of the present invention may be off-line coated, (after manufacturing the film, after it has been heat-set), preferably after conventional surface modification of the polymeric substrate has occurred. Thus, the process of the present invention is intended to cover those situations in which a plain polymeric substrate is produced and then is later off-line coated with the primer coating of the present invention (generally after corona treating the film, or other surface modification, for example). Off-line coating is not preferred, however, because the coating thickness is generally thicker and because dust and the like is apt to be mixed in with the coating because off-line coating processes generally do not occur in "clean environments", unlike in-line manufacturing processes which do occur in a clean environment.

Additionally, it has been determined that the copolyester coated film of U.S. Pat. No. 4,493,872 may be coated off-line with glycidoxy silane and the results of the present invention may be achieved.

While surface modification of the polymeric substrate is not rigidly required, better results are obtained if the surface of the polymeric film is modified immediately before application of the primer coating of the present invention. Conventional well known surface modification techniques are known. Corona treatment of the film is the most common and preferred procedure for modifying the surface of the polymeric substrate. The corona treatment, or other surface modification should be sufficient to permit wetting out of the primer coating. For corona treatment, this is generally along the order of 1.0 w/ft$^2$/min (watt per square foot per minute).

To produce a silicone release film, the primer coated film must be overcoated with a silicone release coating composition. Typical silicone manufacturers are Wacker Silicones Company, General Electric Silicones, PLC (Rhone Poulenc), Dow-Corning and others. The silicone may be a solvent cross-linkable type silicone coating, a solvent-free silicone coating, a solvent-free UV or EB (electron beam) curable silicone coating, or an aqueous based silicone coating, etc. The particular silicone release coating composition employed for the silicone release film is fairly broad and is recommended or produced by silicone manufacturers. The primer coated film of the present invention is not limited to any specific type of silicone release coatings.

The silicone release coating can be applied to a primer coated polymeric film by conventional off-line coating techniques. Conventional off-line coating processes merely require overcoating the primer coated polymeric film with a silicone release coating composition by means of roll coating, reverse roll coating, gravure roll coating, reverse gravure roll coating, brush coating, spray coating, air knife coating, meniscus coating or dipping. No surface modification treatment, such as corona treatment, is necessary before overcoating with the silicone release coating. The off-line coating procedure for the silicone release coating may be conducted on either in-line or off-line primer coated polymeric film.

In-line silicone release coating may be employed on in-line coated primer film. Essentially this technique entails coating the polymeric film in-line with the primer coating either before, during, or after drawing the film, drying the primer coating, and overcoating the primer coating with a silicone release coating, drying as required, and curing the silicone release coating and winding-up the film for further use or sale.

The amount of silicone release coating overcoated on the primed polymeric film varies greatly depending on the type and composition of the silicone release composition. Generally, silicone manufacturers will suggest a coating thickness for the silicone release composition. Typically, however, the thickness of the coating of the dried silicone release composition would be within the range of from about 0.2 to 0.7 pounds per ream. Generally, the dried silicone release coating thickness is thicker than that of the dried primer coating.

The following Examples are illustrative of the invention, but it is understood that the invention is not limited thereto.

GENERAL CONDITIONS

Each silicone release coating applied to the primed film of the present invention is mixed, coated and cured according to the manufacturer's specifications. The coatings were applied to the coated film by means of a wire-wound rod, i.e., Meyer rod. The Meyer rod varied from size 4 to size 12 depending upon the viscosity and the manufacturer's specifications. After curing the silicone release coating on the primed film of the present invention, the adhesion of the silicone to the primed film was checked by rubbing the finger back and forth over the silicone release coating (typically referred to as the rub-off test) and the area was then observed and rated. The ratings for the rub-off test was based upon a scale of 1 to 5, with 5 being the highest rating, where no silicone was removed under strong pressure. A rating of 4 means that there was a slight silicone rub-off under strong pressure. A rating of 3 means there was moderate rub-off of the silicone coating under strong pressure. A rating of 2 indicates that there was heavy rub-off of the silicone coating under strong pressure. And a rating of 1 indicates that there was a distinct and virtual total rub-off even under light pressure.

The silicone release coatings that were employed in the Examples were:
1) Wacker Chemical's silicone 1584, which is a solvent based crosslinkable system having a formulation of silicone-15 grams, toluene-88 grams, crosslinker 1524 (a crosslinker known only to Wacker Chemical)—0.09 gram and catalyst OL (a catalyst known only to Wacker Chemical)—0.05 gram. (A No. 8 Meyer rod was used to apply the silicone to the polymeric substrate with and without the primer coating of the present invention. The coated sheet was cured at 110° C. for 30 seconds);
2) PCL's silicone coating PC-107 is a water based system consisting of silicone—40 grams, distilled water—156 grams, and catalyst PC-95 (a catalyst system of PCL's known only to PCL)—4 grams. (A No. 6 Meyer rod was used to apply the silicone to the polymeric substrate. The coated sheet was cured at 120° C. for 45 seconds);
3) PCL—188 is a silicone water based coating system with the following formulation:
   silicone Type 188—40 grams;
   distilled water—156 grams; and
   catalyst PC-95—4 grams
   (A No. 6 Meyer rod was used to apply this silicone to the polymeric substrate. The coated sheet was cured at 120° C. for 45 seconds);
4) Dow-Corning's Syloff 7044 is a crosslinkable, solvent-free formulation consisting of: silicone type 7044—150 grams, and crosslinker 7048 (a crosslinker known only to Dow-Corning)—6 grams. (A No. 6 Meyer rod was used to apply this silicone to the polymeric substrate. The coated substrate was cured at 130° C. for 60 seconds);
5) Dow Corning's Syloff Q2-7362 is a solvent based crosslinkable silicone system based upon the following formulation:
   silicone Type Q2-7362—40 grams
   crosslinker Q2-7367—0.28 grams
   Toluene—79.86 grams
   (A No. 8 Meyer rod was used to apply this silicone to the polymeric substrate. The polymeric substrate was cured at 120° C. for 20 seconds).

These five silicone release coatings were applied and cured as suggested by the manufacturer.

EXAMPLE 1

A commercially available biaxially oriented polyester film—Type 2000 from the Hoechst Celanese Company was employed as the polymeric substrate for this Example. Type 2000 polyester film with no primer (only coated with the silicone release coating) was the control. The ratio of the glycidoxy silane to the copolyester in the primer coating ranged from 1 to 1, to 1 to 2 parts by weight. Additionally, the percentage of solids in the coating composition ranged from 2% to 6% by weight. The primer coating compositions were applied to the film after corona treatment and between draw steps. The silicone release coating was applied off-line as specified previously. The results are set forth in Tables 1-5 below.

The samples are as follows:

Sample 1—Unprimed PET Type 2000 film coated only with the silicone release coating.

Sample 2—Glycidoxypropyltrimethoxysilane and copolyester at a 1 to 1 ratio in which the primer coating was applied as an aqueous base having 2% solids.

Sample 3—Similar to sample 2 except the ratio of the glycidoxy silane to the copolyester coating was 1 to 2.

Sample 4—Employed a 1 to 2 ratio of the glycidoxy silane to the copolyester coating and employed a 3% solids ratio.

Sample 5—Employed a 1 to 1 glycidoxy silane to copolyester composition at a 4% level of solids.

Sample 6—Employed a 1 to 2 ratio of glycidoxy silane to the copolyester coating at a 4% solids level.

Sample 7—Employed a 1 to 2 ratio of the glycidoxy silane to the copolyester coating at a 6% solids level.

The results are set forth in Tables 1-5 below.

TABLE 1

WACKER 1584 Rub-Off Results

| Sample | Immediately After Coating | 7 Days After Coating | 1 Month After Coating |
|---|---|---|---|
| 1 (Unprimed) | 1 | 1 | 1 |
| 2 2% 1:1 | 5 | 5 | 5 |
| 3 2% 1:2 | 5 | 5 | 4 |
| 4 3% 1:2 | 5 | 5 | 5 |
| 5 4% 1:1 | 5 | 5 | 5 |
| 6 4% 1:2 | 5 | 5 | 5 |
| 7 6% 1:2 | 5 | 5 | 5 |

TABLE 2

PCL PC 107 Rub-Off Results

| Sample | Immediately After Coating | 7 Days After Coating | 1 Month After Coating |
|---|---|---|---|
| 1 (Unprimed) | 1 | — | 1 |
| 2 | 4 | 5 | 4 |
| 3 | 3 | 5 | 3 |
| 4 | 5 | — | 5 |
| 5 | 4 | 5 | 4 |
| 6 | 3 | 5 | 4 |
| 7 | 5 | 5 | 5 |
| Copolyester primer alone | 4 | — | 1 |

TABLE 3

PCL PC 188 Rub-Off Results

| Sample | Immediately After Coating | 7 Days After Coating | 1 Month After Coating |
|---|---|---|---|
| 1 (Unprimed) | 1 | — | 1 |
| 2 | 4 | — | 4 |
| 3 | 2 | — | 2 |
| 4 | 4 | — | 5 |
| 5 | 5 | — | 5 |
| 6 | 5 | — | 5 |
| 7 | 5 | — | 5 |

TABLE 4

DOW CORNING SYLOFF 7044 Rub-Off Results

| Sample | Immediately After Coating | 7 Days After Coating | 1 Month After Coating |
|---|---|---|---|
| 1 (Unprimed) | 3 | 3 | 5 |
| 2 | 4 | 5 | 5 |
| 3 | 4 | 5 | 5 |
| 4 | 4 | 5 | 5 |
| 5 | 4 | 5 | 5 |
| 6 | 4 | 5 | 5 |
| 7 | 4 | 5 | 5 |
| Copolyester primer alone | 3 | 3 | 5 |

TABLE 5

DOW CORNING SYLOFF Q2-7362 Rub-Off Results

| Sample | Immediately After Coating | 7 Days After Coating | 1 Month After Coating |
|---|---|---|---|
| 1 (Unprimed) | 1 | — | 1 |
| 2 | 4 | — | 4 |
| 3 | 2 | — | 2 |
| 4 | 4 | — | 5 |
| 5 | 5 | — | 5 |
| 6 | 5 | — | 5 |
| 7 | 5 | — | 5 |

Tables 1 through 5 indicate that the primer coating composition of the present invention provides sufficient adhesion between the silicone release coating and the polymeric support film which is better than an unprimed polymeric support film. In Tables 2 and 4, a 2000 Type Hoechst Celanese film with the copolyester primer only was employed. This film contains only the copolyester coating, as a primer coating. As Table 2 and 4 indicate, there may be some silane coatings which will adhere better to copolyester type primer coatings than uncoated film, however, copolyester primer coatings by themselves either have adhesion characteristics less than those of the present invention or the initial adhesion results may be satisfactory but long term adhesion results are unsatisfactory.

EXAMPLE 2

The purpose of this Example is to demonstrate that a primer coating of only glycidoxy silane is not as effective as the primer coating of the present invention.

Plain type 2000 film was corona treated and in-line primer coated with an aqueous solution of glycidoxy silane (glycidoxypropyltrimethoxysilane) at a 1% by weight solids level. After the primed film dried, it was overcoated with four different silicone release composition formulas, namely: Wacker 1584; PCL 107, 188; and Dow Corning Syloff Q2-7362 as described with reference to Example 1. The overcoating was performed off-line. For comparison, unprimed silicone release films and two primed films of the present invention, namely 2% and 4% solids by weight 1:2 glycidoxysilane/copolyester primer coatings in-line coated (then off-line overcoated with the silicone release compositions) were tested. The results are set forth in Table 6 below.

TABLE 6

One Month Rub-Off Results

| Primer Coating | Wacker 1584 | PCL 107 | PCL 188 | Syloff Q2-7362 |
|---|---|---|---|---|
| Unprimed | 1 | 1 | 1 | 1 |
| Glycidoxy silane | 1 | 1 | 1 | 1 |
| 2% solids, primer coating of the present invention | 4 | 4 | 5 | 5 |
| 4% solids, primer coating of the present invention | 5 | 4 | 5 | 5 |

The above results demonstrate that unprimed film and film primed with glycidoxy silane only do not yield good adhesion to the silicone release compositions. With respect to the primer coating of the present invention, both the 2% and 4% solids coating results were superior to the glycidoxy silane primed results. At the 2% solids level, only 0.67% by weight was glycidoxy silane. Yet, the 2% by weight solids level primer coating of the present invention was superior to the 1.0% by weight glycidoxy silane primed film.

Previously, Tables 2 and 4 reported that polyester film primed with the copolyester coating described in the Funderburk patent (U.S. Pat. No. 4,493,872) does not yield good adhesion results compared to the present invention. With the above-noted results of copolyester primed film and with the results of this Example, it can be stated that neither portion of the primer coating of the present invention by itself is as good as the combined effects of both.

EXAMPLE 3

In Examples 1 and 2 the primer coating composition was applied in-line (during the manufacturing of the film), between the drawing steps (interdraw). Example 3 is to compare the in-line primer coated films with off-line primer coated films, both films being subsequently off-line coated with the silicone release coating.

Hostaphan ® 2000 polyester film manufactured by the Hoechst Celanese Corporation was corona treated and then coated with a 2% solids primer coating having a glycidoxypropyltrimethoxysilane to copolyester ratio of 1 to 2. A 2% level was employed for the off-line coating procedure because it is roughly equivalent to a 4% solids level of in-line coating, since the stretch orientation causes a thinning of the coated layer as well as the film. The coating was applied with a No. 18 Meyer rod and the sample was dried at 125° C. for 2 minutes. Silicone release coating PCL 107 and Wacker 1584 were then applied off-line in the usual manner. Comparative data with in-line coated and uncoated films are given in Table 7.

TABLE 7

| Sample | After 30 Days | | |
|---|---|---|---|
| | In-Line Coating | Off-Line Coating | Uncoated |
| PCL 107 | 5 | 5 | 1 |
| Wacker 1584 | 5 | 5 | 1 |

The two silicone coatings were chosen because they were the most difficult to adhere to polymeric film. From the data, it is obvious that even after 30 days in-line coating is no different from off-line coating. (The uncoated control is present as a comparison.)

EXAMPLE 4

Examples 1-3 related only to polyester film. In this Example, three different types of polymeric films were employed as the support film. All the various films were first corona treated and then coated with the primer coating of the present invention (except for the control samples having no primer coating) at a 2% solids level (at a 1 to 2 glycidoxypropyltrimethoxysilane to copolyester ratio). The coating was applied with a No. 18 Meyer rod and dried at 125° C. for 2 minutes. Each sample was then coated with PCL 107 silicone release coating according to the specifications set forth by the manufacturer. Each sample was tested for immediate rub-off, and 30 day rub-off. The results are set forth below in Table No. 8.

TABLE 8

| Film | Control No Coating | Immediate Rub-Off | 1 Month Rub-Off |
|---|---|---|---|
| Polycarbonate | 1 | 5 | 5 |
| Polypropylene | 1 | 5 | 5 |
| Polyarylate | 1 | 4 | 5 |

All the polymeric support films gave excellent results even after 30 days when the primer coating of the present invention was employed. When no primer coating was employed, the results were poor.

EXAMPLE 5

All previous Examples were run with the primer coating composition of the present invention having a ratio of 1 to 1, or 1 to 2 with respect to the amount of glycidoxypropyltrimethoxysilane and copolyester. In this Example, the ratio of silane to copolyester was run at a 2 to 1 ratio and at a 2% solids level and a 6% solids level. The samples were primer coated in-line. Each sample was coated with Wacker 920 silicone release coating using a No. 8 Meyer rod. The silicone release coating, applied to the primer film, was dried for 30 seconds at 120° C. The rub tests (after 7 days) for these samples are set forth in Table 9 below.

TABLE 9

| Solids Level | Ratio | 7 Day Rub-Off |
|---|---|---|
| 2 | 1:2 | 4 |
| 2 | 2:1 | 5 |
| 6 | 1:2 | 5 |
| 6 | 2:1 | 5 |

EXAMPLE 6

This Example demonstrates that aliphatic dicarboxylic acids may be employed in the primer coating composition. In sample 1, a 4% by weight solids primer coating comprising 1.4% by weight glycidoxypropyltrimethoxysilane and 2.6% by weight of Copolyester A was employed at a coating thickness of 0.86 micro inch. Copolyester A is the reaction product of an acid component comprising 45% by weight isophthalic acid, 10% by weight sodium 5-sulfoisophthalic acid, and 45% by weight malonic acid; and an equimolar amount of a glycol component (ethylene glycol). In Sample 2, a 4% by weight solids primer coating comprising 1.4% by weight glycidoxypropyltrimethoxysilane and 2.6% by weight of Copolyester B was employed at a coating thickness of 1.03 inch. Copolyester B is the reaction product of an acid component comprising 90% by weight isophthalic acid and 10% by weight sodium-5 sulfoisophthalic acid; and an equimolar amount of a glycol component (ethylene glycol). In both samples 1 and 2, the primer coating was coated on corona treated Type 2000 polyester film, dried and overcoated with PCL-107 silicone release coating as described in Example 1. Ruboff tests were conducted on two sheets per sample for the time period immediately after drying the silicone release coating, seven days after and one month after. The results are set forth in Table 10 below.

TABLE 10

| | Rub-Off Results | | |
|---|---|---|---|
| | Immediate | 7-day | 30 day |
| Sample 1 | 4,5 | 5,5 | 5,5 |
| Sample 2 | 5,5 | 5,5 | 5,5 |

EXAMPLE 7

Previously, it was mentioned that the results of the present invention may be achieved by overcoating the polyester coated film of U.S. Pat. No. 4,493,872 (to Funderburk et al) with glycidoxy silane. In this Example, a polyester film manufactured by the Hoechst Celanese Corporation was coated in-line (during the manufacturing of the film) with the copolyester coating described in the above-identified U.S. patent to Funderburk et al. This film served as the basis for Controls 1 and 2, and Samples 1 and 2.

Control 1 for this Example was then overcoated off-line (i.e., after heat setting of the film) with PCL-107 silicone release coating previously mentioned. Control 2 was off-line coated with Wacker Chemical Company 1571 aqueous based silicone release coating which included the required crosslinker 1572 employed at a level recommended by Wacker Chemical Company. Sample 1 was overcoated off-line with an aqueous solution containing 1.5% by weight glycidoxy silane, dried, and again overcoated with PCL-107 silicone release coating. Sample 2 was overcoated off-line with an aqueous solution containing 1.5% by weight glycidoxysilane, dried, and again overcoated with Wacker Chemical 1571/1572 silicone release coating. All samples were coated with a Meyer rod. The rub-off results for 1 day and 30 days are set forth below in Table 11.

TABLE 11

| | Rub-off Results | |
|---|---|---|
| | 1 day | 30 days |
| Control 1 | 2 | 1 |
| Sample 1 | 4 | 4 |
| Control 2 | 1 | 2 |
| Sample 2 | 5 | 4 |

Thus it is apparent that there has been provided, in accordance with the invention, a process of priming a support film with a primer coating, and perhaps overcoating with a silicone release coating, that fully satisfies the objects, aims, and aspects set forth above. While the invention has been described in conjunction with the specific embodiments thereof, it is evident that many alternatives, modifications and variations will be apparent to those skilled in the art in light of the foregoing description. Accordingly, it is intended to embrace all such alternatives, modifications, and variations as falling within the sphere and broad scope of the present invention.

What is claimed is:

1. A process for priming a polymeric film to bond to a silicone release coating, comprising:
    a) priming a polymeric film with an aqueous-based primer coating, said primer coating comprising, before dilution:
        i) from 25 to 75% by weight of a glycidoxy silane; and
        ii) from 75 to 25% by weight of a copolyester mixture, said copolyester mixture comprising:
            a) from about 40 to 98 mol percent isophthalic acid;
            b) from about 0 to about 50 tool percent of at least one aliphatic dicarboxylic acid;
            c) from about 2 to about 20 tool percent of at least one sulfomonomer containing a sulfonate group attached to a dicarboxylic nucleus;
            d) about 100 mol percent of glycol having from about 2 to 11 carbon atoms; and
    b) drying said primer coating on said polymeric film.

2. The process of claim 1, wherein said glycidoxy silane is represented by the formula X—Y—Si—$R_1R_2R_3$, wherein X is a glycidoxy group, Y is an alkylene group, $R_1$ and $R_2$ are hydrolyzable groups, and $R_3$ is a hydrolyzable or non-hydrolyzable group.

3. The process of claim 2, wherein said glycidoxy silane is glycidoxypropyltrimethoxysilane or glycidoxypropylmethyldiethoxysilane.

4. The process of claim 1, wherein said aliphatic dicarboxylic acid is selected from the group consisting of malonic, adipic, azelaic, glutaric, sebacic, suberic, succinic, brassylic and mixtures thereof.

5. The process of claim 1, wherein said sulfomonomer is represented by the formula:

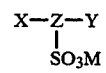

wherein M is a monovalent cation of an alkali metal, ammonium, substituted ammonium, or quaternary ammonium; Z is a trivalent radical; and X and Y are carboxyl groups or polyester forming equivalents.

6. The process of claim 5, wherein said sulfomonomer is selected from the group consisting of ammonium sulfoterephthalic acid, alkali metal sulfoterephthalic acid, ammonium 5-sulfoisophthalic acid, alkali metal 5-sulfoisophthalic acid, ammonium sulfophthalic acid, alkali metal sulfophthalic acid, 5-(p-ammoniumsulfophenoxy)isophthalic acid, 5-(sulfopropoxy)-isophthalic acid and sodium salt.

7. The process of claim 1, wherein glycol is selected from the group consisting of ethylene glycol; butanediol; 1,5-pentanediol; 1,6-hexanediol; neopentyl glycol; 1,10-decanediol; cyclohexanedimethanol; and diethylene glycol.

8. The process of claim 1, wherein said glycidoxysilane is glycidoxypropyltrimethoxysilane, said sulfomonomer is sodium 5-sulfoisophthalic acid, and said glycol is ethylene glycol.

9. The process of claim 1, wherein said polymeric film is coated on both sides with said primer coating.

10. The process of claim 1, wherein said primer coating on said film after drying is from about $1 \times 10^{-7}$ to $1 \times 10^{-4}$ inch thick.

11. The process of claim 1, wherein said polymeric film is polyamides, polyolefins, polyesters, polyacetal, or polycarbonate.

12. A process for bonding a silicone release coating to a polymeric film, comprising:
   a) priming a polymeric film with an aqueous-based primer coating, said primer coating comprising, before dilution:
      i) from 25 to 75% by weight of a glycidoxy silane; and
      ii) from 75 to 25% by weight of a copolyester mixture, said copolyester mixture comprising:
         a) from about 40 to 98 mol percent isophthalic acid;
         b) from about 0 to about 50 mol percent of at least one aliphatic dicarboxylic acid;
         c) from about 2 to about 20 mol percent of at least one sulfomonomer containing a sulfonate group attached to a dicarboxylic nucleus;
         d) about 100 mol percent of glycol having from about 2 to 11 carbon atoms;
   b) drying said primer coating on said polymeric film thereby forming a dried primed film; and
   c) coating said dried primed film with a silicone release composition such that it bonds to said dried primed film, said coating applied at an effective amount to prevent an adhesive backed article from adhering to said polymeric film.

13. The process of claim 12 wherein said silicone release composition is solvent-based silicone coatings or, solvent-free silicone coatings.

14. The process of claim 12, wherein said glycidoxy silane is represented by the formula $X-Y-Si-R_1R_2R_3$, wherein X is a glycidoxy group, Y is an alkylene group, $R_1$ and $R_2$ are hydrolyzable groups, and $R_3$ is a hydrolyzable or non-hydrolyzable group.

15. The process of claim 12, wherein said glycidoxy silane is glycidoxypropyltrimethoxysilane glycidoxypropylmethyldiethoxysilane.

16. The process of claim 12, wherein said aliphatic dicarboxylic acid is selected from the group consisting of malonic, adipic, azelaic, glutaric, sebacic, suberic, succinic, brassylic and mixtures thereof.

17. The process of claim 12, wherein said sulfomonomer is represented by the formula:

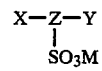

wherein M is a monovalent cation of an alkali metal, ammonium, substituted ammonium, or quaternary ammonium; Z is a trivalent radical; and X and Y are carboxyl groups or polyester forming equivalents.

18. The process of claim 17, wherein said sulfomonomer is selected from the group consisting of ammonium sulfoterephthalic acid, alkali metal sulfoterephthalic acid, ammonium 5-sulfoisophthalic acid, alkali metal 5-sulfoisophthalic acid, ammonium sulfophthalic acid, alkali metal sulfophthalic acid, 5-(p-ammoniumsulfophenoxy)-isophthalic acid, 5-(sulfopropoxy)-isophthalic acid and sodium salt.

19. The process of claim 12, wherein glycol is selected from the group consisting of ethylene glycol; butanediol; 1,5-pentanediol; 1,6-hexanediol; neopentyl glycol; 1,10-decanediol; cyclohexanedimethanol; and diethylene glycol.

20. The process of claim 12, wherein said glycidoxysilane is glycidoxypropyltrimethoxysilane, said sulfomonomer is sodium 5-sulfoisophthalic acid, and said glycol is ethylene glycol.

21. The process of claim 12, wherein said polymeric film is coated on both sides with said primer coating.

22. The process of claim 12, wherein said primer coating on said film after drying is from about $1 \times 10^{-7}$ to $1 \times 10^{-4}$ inch thick.

23. The process of claim 12, wherein said polymeric film is polyamides, polyolefins, polyesters, polyacetal, or polycarbonate.

24. The process of claim 12, wherein said priming step, said drying step, and said coating step occur in-line during the manufacturing process for producing the polymeric film.

25. The process of claim 12, wherein said priming said polymeric film occurs in-line during the manufacturing process of the polymeric film and said coating step occurs off-line after heat-setting the polymeric film.

26. The process of claim 13 wherein said solvent based silicone coatings are aqueous based silicone coatings.

27. The process of claim 13 wherein said solvent free silicone coatings are ultraviolet curable coatings or electron beam curable coatings.

* * * * *